United States Patent [19]

Lahti et al.

[11] 4,157,839

[45] Jun. 12, 1979

[54] BABY CARRIAGE ACCESSORY

[76] Inventors: Jayne L. Lahti, 33 Rockledge Rd., Montville, N.J. 07045; Barbara A. Hoff, R.D. No.4, Box. 337, Sussex, N.J. 07461

[21] Appl. No.: 887,649

[22] Filed: Mar. 17, 1978

[51] Int. Cl.² .................. B62B 11/00; A47C 7/02
[52] U.S. Cl. ...................... 280/642; 280/643; 280/644; 280/647; 280/649; 280/650; 297/230
[58] Field of Search ........ 280/642, 643, 644, 647–650, 280/658; 297/230, 231

[56] References Cited

U.S. PATENT DOCUMENTS

| | | | |
|---|---|---|---|
| 2,577,579 | 12/1951 | Hall | 280/643 |
| 2,781,225 | 2/1957 | Heideman | 280/642 |
| 2,873,123 | 2/1959 | Eppinger | 280/643 |
| 3,093,407 | 6/1963 | Wilson | 297/230 |
| 3,542,421 | 11/1970 | Ambrose | 297/230 |

*Primary Examiner*—Robert R. Song
*Attorney, Agent, or Firm*—Jacobs & Jacobs

[57] ABSTRACT

An accessory for a foldable baby carriage having a seat disposed on a collapsible tubular frame is disclosed in which the accessory has a first and second portion, the first portion constituting a cushion for the bottom and back of the seat when the carriage is open but which folds within the carriage when the carriage is collapsed and a second portion which is joined to the first portion and forms a bag-like receptacle when the carriage is unfolded but which encircles the folded frame and enclosed first portion so as to secure both but remain accessible to the operator of the carriage.

3 Claims, 3 Drawing Figures

BABY CARRIAGE ACCESSORY

DETAILED DESCRIPTION

Foldable baby carriages having a seat disposed on a collapsible tubular frame are well known and in wide use. Typical of these structures is the type described in U.S. Pat. No. 3,390,893 in which two frames are interpivotally connected by means of a two-axes pivot joint, the frames being held in their unfolded position at a fixed angle with respect to each other by brace members pivotally connected to the frame. Generally disposed within the frame is a seat of fabric construction, as for example a polyolefin mesh. The carriage will ride on four wheels, or four pairs of double wheels, disposed at the lower portion of the frame.

Such carriages have proved to be of great convenience in that while providing adequate transportation for the child, the carriage is also lightweight and compact when folded and thus easily transported and stored.

The present invention has as a first object to provide an accessory for such foldable baby carriage which accessory provides additional protection and comfort for the occupant of the carriage when unfolded and which also facilitates the storage and transportation of the carriage in its folded configuration. Other objects of the invention will be apparent from the following description and the drawings in which.

Figure 1:
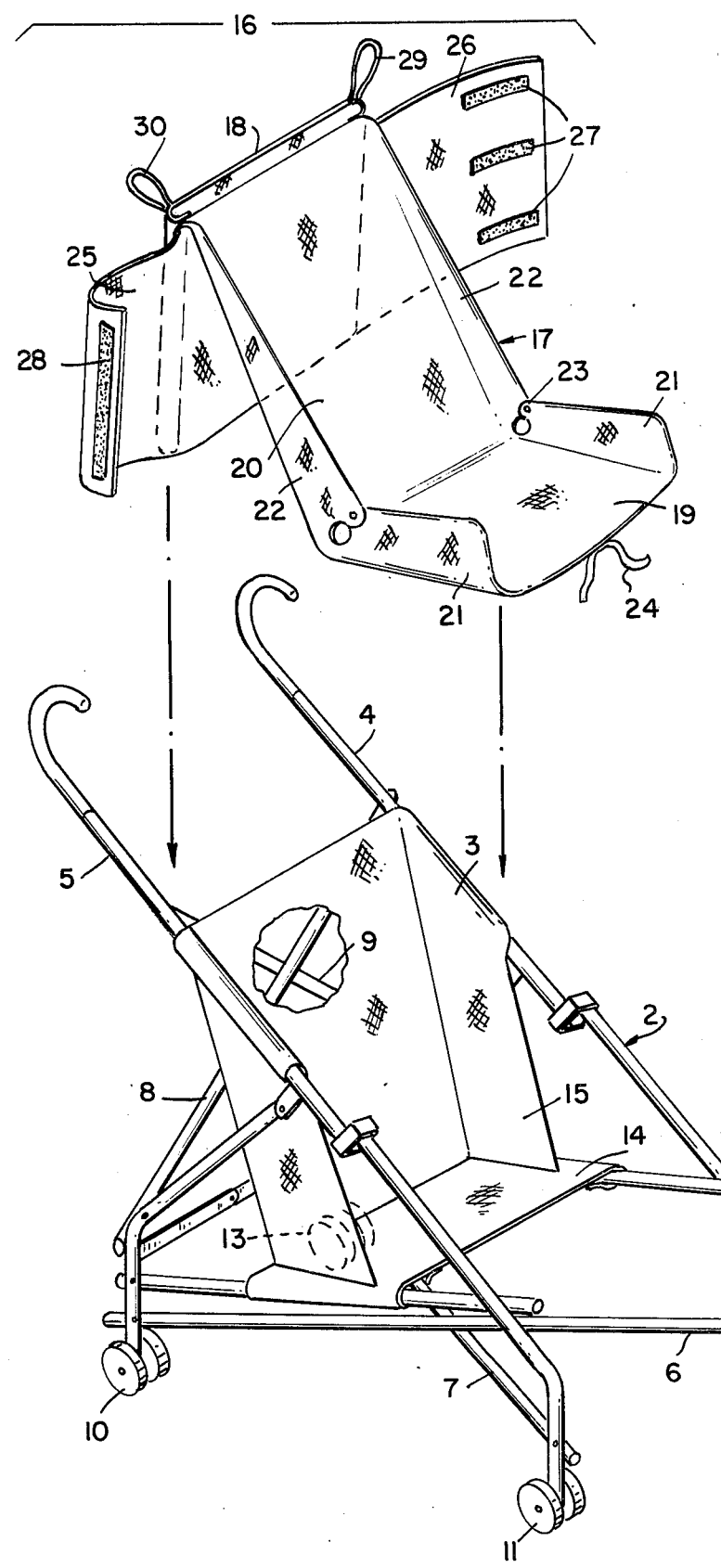
FIG. 1 is an exploded view in perspective of a typical foldable baby carriage and one embodiment of the present invention.

Referring now to FIG. 1 in greater detail, there is shown a baby carriage having a collapsible tubular frame 2 on which is disposed a fabric seat 3. Seat 3 is stretched between two frames 4 and 5 which are held in position by bottom brace members 6 and 7 and back brace members 8 and 9, a portion of seat 3 being broken away to reflect the crossed pivotal arrangement of back brace members 8 and 9. The entire carriage rolls on wheels 10, 11, 12 and 13. Seat 3 includes a bottom portion 14 and a back portion 15 which are generally joined at their juncture through stitching or the like.

Accessory 16 has a first portion 17 and a second portion 18. The first portion 17 has a bottom cushion 19 and back cushion 20 which are constructed so as to conform to the seat 14 and back 15 of the carriage when unfolded. In addition, the first portion 17 of the accessory can have side portions 21 and 22 which extend from bottom 19 and back 20, respectively. In order to maintain the configuration of the first portion, side portions 21 and 22 can be joined at tuck 23, either by conventional stitching or by a detachable snap. In addition, bottom 19 can be provided with a tie 24 which, if desired, can be fastened to a safety strap on seat 14 (not shown).

The second portion of accessory 16 is a bag-like receptacle 18 joined on one side of its open end to the top of back cushion 20. As such, when accessory 16 is placed in the foldable baby carriage so that bottom cushion 19 rests on seat 14 and back cushion 20 rests on back 15, second portion 18 will hang on the closing side of back brace members 8 and 9, freely accessible between side frame members 4 and 5.

Disposed on the same side of second portion 18 as it is joined to the top of back cushion 20 are two extensions 25 and 26. These extensions are provided with connecting means 27 and 28 by which the two flaps can be detachably joined. In particular, with the accessory in position in the unfolded carrier as described above, extensions 25 and 26 pass through the side openings of back brace members 8 and 9 so as to be disposed on the seat side thereof and are then fastened through engagement of attaching means 27 and 28. These attaching means can be conventional snaps, buttons and button holes, a zipper, or as is shown in FIG. 1 complementing Velcro strips.

There is thus produced from a unitary accessory a cushion means of increased confort to the occupant of the baby carriage, a suitable receptacle for packages, bottles, diapers and the like and means to securely fix the accessory to the baby carriage. Extensions 25 and 26 thus lock the accessory in position. In addition, there will be provided at approximately the junction of first portion 17 and second portion 18 loop means 29 and 30 which are operable to fit over frame members 4 and 5 to provide additional support and securing of the device.

Figure 2:
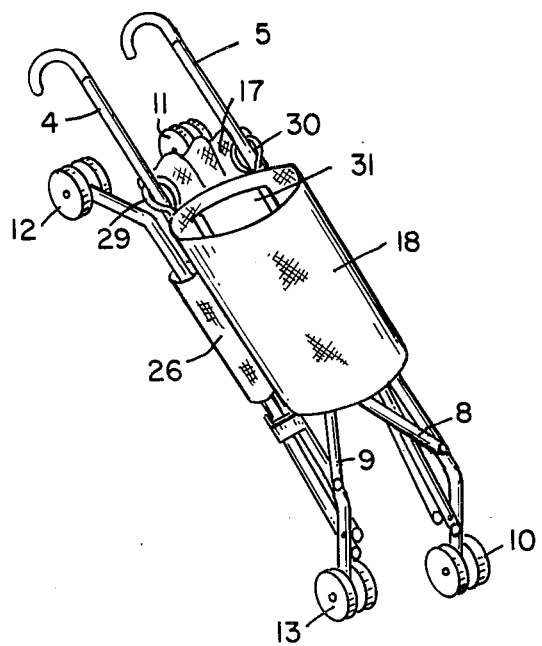
FIG. 2 is a perspective view of the accessory and baby carriage in its folded configuration.

As shown in FIG. 2, the carriage can be folded in its conventional manner with accessory 16 intact. To accomplish this, extensions 25 and 26 are disengaged and the carriage collapsed in its conventional manner. Upon the collapse or folding of the carriage, first portion 17 will be embraced within the collapsing tubular frame whereas second portion 18 will be free of the converging parts and remain freely accessible on the rear of the collapsed or folded frame. Extensions 25 and 26 can then be reengaged, this time however about the folded frame, thereby provided increased insurance against accidental opening as well as protection for the folded frame, seat and first portion of the accessory. It will thus be seen that even in its folded configuration, the baby carriage with the accessory of the present invention provides a convenient method of conveyance for various packages and objects while at the same time providing convenient storage and protection for the portions of the carriage and accessory not then in use.

A further convenient modification includes an inner receptacle 31 in which, when seat accessory 16 is removed from the baby carriage, first portion 17 can be stored by folding it back on itself and into the receptacle 31. The second receptacle is thus in the nature of an inner pocket in the bag-like receptacle constituting second portion 18 of accessory 16.

Figure 3:
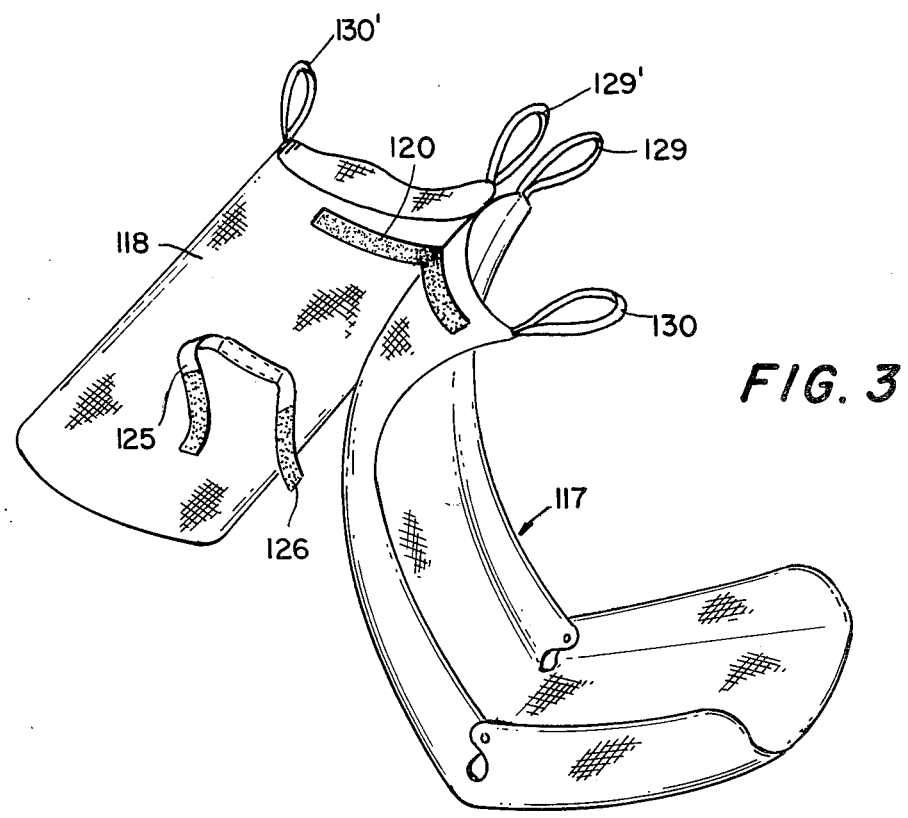
FIG. 3 is a further embodiment of the accessory of the present invention.

FIG. 3 depicts a further embodiment of the present invention in which first portion 117 and second portion 118 are detachably joined at 120. The detachable joining means 120 can again be any of the conventional means including buttons, zippers complementing Velcro strips, snaps or the like. This embodiment offers the advantage that second portion 118 can be readily separated from first portion 117 without removing the latter from the carriage. Second portion 118 thus assumes the additional characteristics of a conventional shopping bag which can be easily removed and rejoined to the first portion without disturbing the occupant of the baby carriage.

In addition, the accessory shown in FIG. 3 can carry a plurality of loop means 129, 129', 130 and 130'. Loop means 129 and 130 function in a manner entirely analogous to that described above for loop means 29 and 30 in the embodiment of FIGS. 1 and 2. Loop means 129' and 130' can similarly function in this fashion, providing additional support when first portion 117 and second portion 118 are joined and in position in the baby carriage (or independent support for second portion 118 should the latter not be joined, or be joined inadequately to the first portion when positioned in the baby carriage), and in addition act as handle means for second portion 118 when the same is detached from first portion 117 and utilized as a shopping bag.

Finally, in the embodiment depicted in FIG. 3, the means operable to connect the receptacle to the rear of the carriage frame when unfolded and to encircle the same when folded, corresponding to extensions 25 and 26 in the embodiment of FIG. 1, can be a strap having two engagement portions 125 and 126. While this strap provides less protection than the larger extensions 25 and 26 when the carriage is folded, it can be somewhat more convenient when the accessory is frequently used and rapid interconversion between the two modes is desired. The two ends 125 and 126 of this strap are again provided with means for their interconnection, as for example a button, snap or complementing Velcro strips.

The entire accessory is fabricated from a fabric of suitable strength and durability, it of course being possible for the first portion to be fabricated from a fabric selected primarily for comfort while the second portion is fabricated from a different fabric having greater properties of strength. Alternatively, the entire accessory can be fabricated from the same fabric and indeed as will be apparent to those skilled in the art, an embodiment such as that shown in FIG. 1 can be fabricated from a single piece of fabric. It is also apparent that the first portion, while susceptible to some degree of padding for comfort cannot be so bulky as to interfere with the folding of the carriage itself.

The foregoing description and drawings represent typical embodiments of the present invention but are not intended as limitations on the scope thereof, it being apparent that the invention can be practiced through obvious modifications and rearrangements without departing from the essential spirit thereof. 9n

What is claimed is:

1. A baby carriage accessory for a foldable carriage having a seat disposed on a collapsible tubular frame, said accessory having (1) first and second portions, (a) said first portion having bottom and back cushions operable to (i) conform to the bottom and back, respectively, of the carriage seat when the carriage is unfolded but (ii) permit unhindered folding of said carriage, and (b) said second portion comprising a baglike receptacle joined on one side of its open end to the top of the back cushion of said first portion and having, disposed on the same side as it is joined to said back cushion, means operable to (i) connect said receptacle to the rear of said carriage frame when unfolded and (ii) to encircle both said frame when folded and said first portion, and (2) loop means operable to engage opposing side portions of said carriage frame, said loop means being disposed approximately at the junction of said first and second portions.

2. An accessory according to claim 1 wherein said first and second portions are detachably joined.

3. An accessory according to claim 1 wherein said second portion includes an inner receptacle operable to receive and store said first portion.

* * * * *